March 26, 1929.    P. W. LEHMAN    1,706,697
APPLYING TREADS TO TIRE CASINGS
Filed Oct. 9, 1926
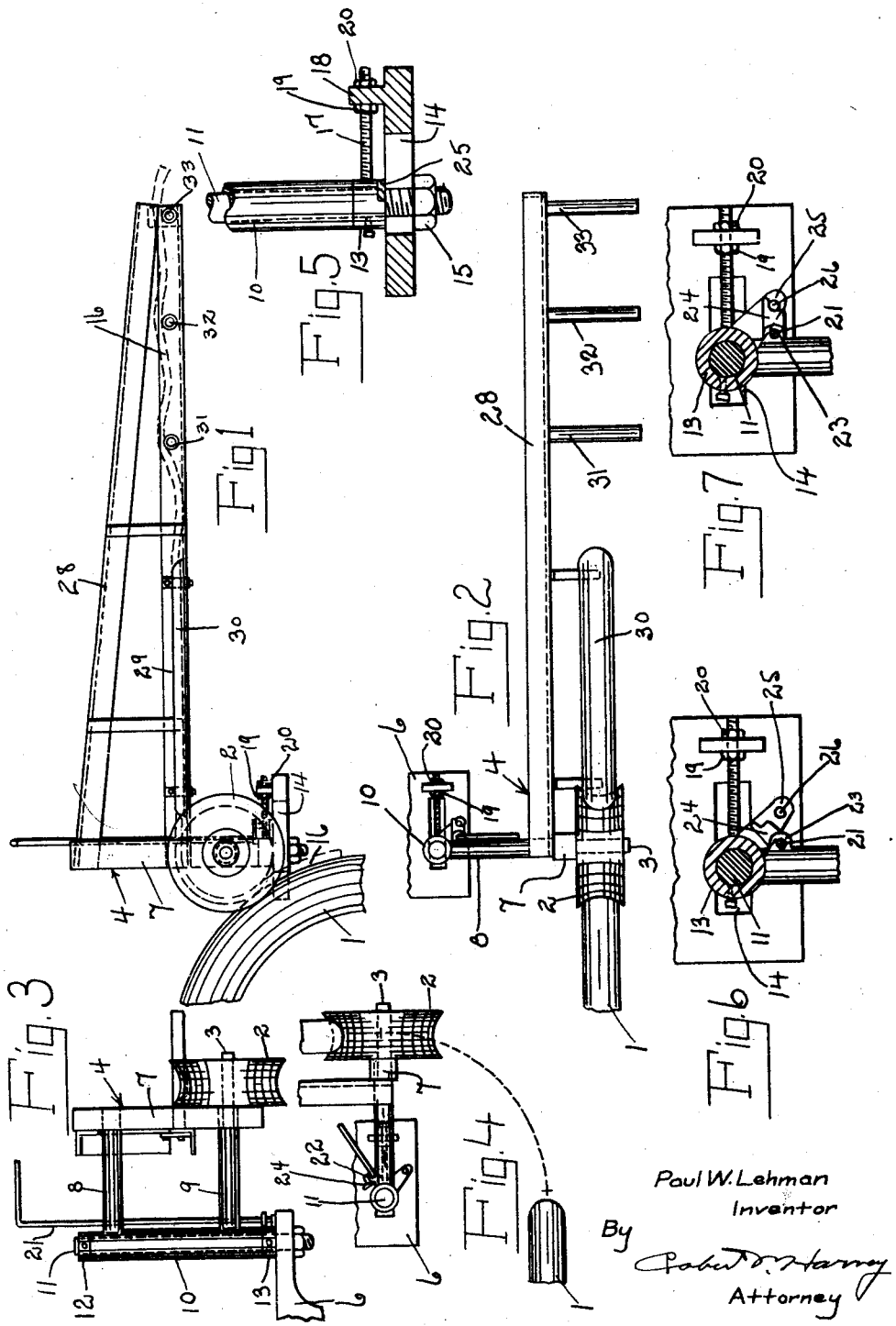
Paul W. Lehman
Inventor
By
Attorney Patented Mar. 26, 1929.

1,706,697

UNITED STATES PATENT OFFICE.

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

APPLYING TREADS TO TIRE CASINGS.

Application filed October 9, 1926. Serial No. 140,569.

My invention relates to a method of applying the tread rubber to the carcass of pneumatic tire casings and a device which may be used for carrying out that method.

The tread rubber is usually formed as a strip, of desired cross section, either by the use of a suitably shaped tubing die or grooved calender rolls.

The tread rubber is usually formed as a strip of desired cross section, either by the use of a suitably shaped tubing die or a calender having suitably grooved rolls. It has been the practice heretofore to cut this strip into lengths substantially equal to the outer circumference of the tire casing. For economy of operation it is the usual practice to cut the tread strip into lengths as it comes from the forming means, a cooling tank being interposed between the cutter and the forming means. The cooling operation is necessary, among other reasons, because the stock has a tendency to shrink as it cools. Variation in the amount of shrinkage which has taken place at the time the tread is cut, with a consequent variation in the amount of shrinkage of the treads after they are cut to length, has the result that at the time the treads are finally applied to the tire carcass they vary in length and this variation has proved a troublesome factor in the machine application of the treads to the carcass. In practically all of the devices now in use for the purpose the tread is held stretched to exact length around a drum or on a flat surface and applied directly from such drum or surface to the carcass. Such devices are cumbersome and require an extra handling of the tread in placing it on the drum or surface. Furthermore the volume of tread going into different tires varies due to varying degrees of shrinkage at the time the tread is cut to length.

It is the object of my invention to provide a method which will assure a substantially uniform volume of tread and a simplified device for accurately applying the tread to the tire carcass.

Other and further objects will be apparent from the following specification and claims.

In the accompanying drawings which illustrate one embodiment of my invention

Figure 1 is a side elevation of my device in operative relation to the building core, Figure 2 is a plan view of the structure shown in Figure 1, Figure 3 is a front elevation of the structure as shown in Figure 1 with the core omitted, Figure 4 is a fragmentary plan view showing the device in inoperative position, Figure 5 is a detail of the pressure adjusting means, and Figures 6 and 7 are details showing the locking means in unlocked and locked positions respectively.

I believe that the so called shrinkage of the tread is, in substantial part a longitudinal contraction due to the fact that in passing through the hot die of the tuber or the heated calender rolls the rubber is expanded and drawn out longitudinally causing an interior stress which when the tread strip is relieved from pressure and allowed to cool results in a longitudinal contraction. The tread as a result has a greater volume and weight per foot of length and a larger cross section after it has been allowed to completely cool and shrink than at the time it left the calender, and this volume and weight progressively increases from the time it leaves the calender until cooling and shrinkage is complete. The strip may be cut to length at any time during the shrinking and cooling process and later stretched to normal length about a drum or on a flat surface from which it may be directly transferred to the tire carcass and the ends will meet, but it is obvious that the volume of rubber in the treads will vary depending on the time at which they were cut to length.

According to my method I propose to cut the tread to exact weight rather than to exact length and apply the tread to the casing under a predetermined degree of tension or stretch so as to bring the tread to the desired per foot volume and length required to have the ends meet when applied to the carcass and result in a uniform volume of tread. While my method can be carried out by the applying devices now in use, I prefer to use a device embodying the principles disclosed in the accompanying drawings which takes advantage of the uniform volume or weight of the tread to accomplish a substantial simplification of the applying device.

Referring to the drawings 1 designates the rotatable core of a tire building machine, upon which the tire carcass is formed and which serves as a support for the latter while the tread is applied. The applying device comprises a presser roll 2 rotatably mounted on a stub shaft 3 carried by a frame 4 pivotally secured to a bracket 6 suitably secured to or formed integral with, the frame of the building machine. Frame 4 comprises an upright 7 connected by cross members 8 and 9 to a tubular member 10 rotatably mounted on an upright shaft 11, between fixed collars 12 and 13. Shaft 11 is adjustably secured to bracket 6 as shown in Figure 5. As shown in the latter figure the end of shaft 11 which is threaded passes through a slot 14 formed in bracket 6 and the shaft is clamped in adjusted position by a nut 15. This adjustment of shaft 11, as is obvious controls the distance of roll 2 from the core when the device is in operative position as shown in Figure 1, and consequently the pressure applied to the tread 16 as the latter is pressed against the core as shown in dotted lines in the latter figure. In order to secure a line adjustment of the position of shaft 11, the collar 13 is provided with a threaded extension 17 passing through a lug 18 secured to bracket 6 and provided with nuts 19 and 20. With nut 15 loosened nuts 19 and 20 may be manipulated in an obvious manner to adjust the position of shaft 11 after which nut 15 is tightened to firmly hold the shaft in adjusted position.

I also provide means for locking the device in operative position as shown in Figures 1 and 2. As best shown in Figures 3, 6 and 7 this means comprises a vertical shaft 21, journaled in lugs 22 and 23 secured to cross members 8 and 9, and provided at its lower end with a locking cam 24. The upper end of shaft 21 is bent as shown in Figure 3 to form a handle. Collar 13 is provided with an arm 25 carrying a pin 26 adapted to cooperate with cam 24. When the device is swung from the inoperative position shown in Figure 4 to the operative position shown in Figure 2 cam 24, as shown in Figures 4 and 6 is in a position to pass pin 26 and is thereafter turned as shown in Figure 7 to engage pin 26 to force the roll 2 firmly against the tread and lock it in such position.

As shown in Figures 1 and 2 frame 4 includes rearwardly extending members 28 and 29, supporting a curved tread guide member 30 and tread supporting rollers 31, 32 and 33.

In operation the roll 2 is swung into position adjacent the core, the tread to be applied is laid on guide member 30 and rollers 31, 32 and 33 and the forward end brought around roll 2 and pressed against the core by the action of locking cam 24 against pin 26. The core is then set in rotation, thereby drawing the tread onto the tire, the operator keeping the tread snugly against roll 2 and centered in guide 30 and the groove of roll 2. If the tread has contracted to increase its volume and consequently its thickness the pressure of roll 2 transversely compresses the tread thereby stretching it longitudinally in the direction of its free end with the result that as it is applied it is brought to the predetermined cross section and length and the ends of the tread are brought into desired relation on completion of the rotation of the core. In other words a given volume of tread rubber is brought to proper length as it is applied to the carcass by the application of pressure, if shrinkage has taken place.

I claim:

1. A device for applying the tread to a tire carcass comprising a grooved roll adapted to be moved into a predetermined fixed spaced relation with respect to a rotatable core adapted to support the tire carcass, and means to lock the roll against movement away from the core.

2. A device for applying the tread to a tire carcass comprising a freely rotatable grooved roll adapted to be moved into a predetermined fixed spaced relation with respect to a rotatable core adapted to support the tire carcass, and means to lock the roll against movement away from the core.

3. A device for applying the tread to a tire carcass comprising a grooved roll adapted to be moved into a predetermined fixed spaced relation with respect to a rotatable core adapted to support the tire carcass, means for adjusting the fixed spacing of the roll and core, and means to lock the roll against movement away from the core.

4. A device for applying the tread to a tire carcass comprising a grooved roll adapted to be moved into a predetermined fixed spaced relation with respect to a rotatable core adapted to support the tire carcass, and means to lock the roll against movement away from the core, means to freely support a tread strip adjacent the roll and means to guide the strip from the support to the roll.

5. A device for applying the tread to a tire carcass comprising a freely rotatable grooved roll adapted to be moved into a predetermined fixed spaced relation with respect to a rotatable core adapted to support the tire carcass, and means to lock the roll against movement away from the core, means to freely support a tread strip adjacent the roll and means to guide the strip from the support to the roll.

6. A device for applying the tread to a tire carcass comprising a grooved roll adapted to be moved into a predetermined fixed spaced relation with respect to a rotatable core adapted to support the tire carcass, means for adjusting the fixed spacing of the roll and core, and means to lock the roll against movement away from the core, means to freely support a tread strip adjacent the roll and means to guide the strip from the support to the roll.

7. A device for applying the tread to a tire carcass comprising a roll provided with a groove corresponding substantially to the tread cross section and adapted to be moved into a predetermined fixed spaced relation with respect to a rotatable core adapted to support the tire carcass, means for adjusting the fixed spacing of the roll and core, and means to lock the roll against movement away from the core, means to freely support a tread strip adjacent the roll and means to guide the strip from the support to the roll.

In testimony whereof I have signed my name to the above specification.

PAUL W. LEHMAN.